(12) United States Patent
Resconi et al.

(10) Patent No.: US 8,946,363 B2
(45) Date of Patent: Feb. 3, 2015

(54) SOLID PARTICULATE CATALYSTS COMPRISING BRIDGED METALLOCENES

(75) Inventors: Luigi Resconi, Porvoo (FI); Pascal Castro, Helsinki (FI); Lauri Huhtanen, Loviisa (FI)

(73) Assignee: Borealis AG, Vienna (AT)

( * ) Notice: Subject to any disclaimer, the term of this patent is extended or adjusted under 35 U.S.C. 154(b) by 0 days.

(21) Appl. No.: 13/643,858

(22) PCT Filed: Apr. 27, 2011

(86) PCT No.: PCT/EP2011/056672
§ 371 (c)(1),
(2), (4) Date: Jan. 17, 2013

(87) PCT Pub. No.: WO2011/135004
PCT Pub. Date: Nov. 3, 2011

(65) Prior Publication Data
US 2013/0116394 A1    May 9, 2013

(30) Foreign Application Priority Data
Apr. 28, 2010  (EP) .................................... 10161364

(51) Int. Cl.
C08F 4/642       (2006.01)
C08F 4/6592      (2006.01)
C08F 10/00       (2006.01)
C08F 110/06      (2006.01)
C08F 4/659       (2006.01)

(52) U.S. Cl.
CPC ......... *C08F 4/65927* (2013.01); *C08F 4/65912* (2013.01); *C08F 10/00* (2013.01); *C08F 110/06* (2013.01); *Y10S 526/943* (2013.01)
USPC ........... 526/160; 526/165; 526/348; 526/351; 526/943; 502/103; 502/107; 502/152

(58) Field of Classification Search
CPC .... C08F 4/65912; C08F 4/6592; C08F 10/00; C08F 110/06
USPC .......... 526/160, 165, 348, 351, 943; 502/103, 502/107, 152
See application file for complete search history.

(56) References Cited

U.S. PATENT DOCUMENTS 6,383,968 B1 *  5/2002  Meijers et al. ................. 502/104
8,729,206 B2    5/2014  Resconi et al.

FOREIGN PATENT DOCUMENTS

| EP | 10161364 | 4/2010 |
| EP | 10196564 | 6/2011 |
| EP | 2563821  | 3/2013 |
| WO | WO-03/051934 A2 | 6/2003 |
| WO | WO-2006/069733 A1 | 7/2006 |
| WO | WO-2007/116034 A1 | 10/2007 |
| WO | WO 2011/135004 | 11/2011 |
| WO | WO-2011/135005 A2 | 11/2011 |

OTHER PUBLICATIONS

Busico V, et al. (2001) Microstructure of polypropylene. *Progress in Polymer Science*, 26(3): 443-533.
De Rosa C, et al. (2005) Crystallization Behavior and Mechanical Properties of Regiodefective, Highly Stereoregular Isotactic Polypropylene: Effect of Regiodefects versus Stereodefects and Influence of the Molecular Mass. *Macromolecules*, 38: 9143-9154.
Enders A, et al. (2000) Die fluorige Phase: Organische Chemie mit hochfluorierten Reagenzien and Lösungsmitteln. *Chemie in unserer Zeit*, 34(6): 382-393.
Gahleitner, et al. (2011) International Polymer Processing, 26: 2-20.
Lo Nostro P, et al. (1995) Phase separation properties of fluorocarbons, hydrocarbons and their copolymers. *Advances in Colloid and Interface Science*, 56: 245-287.
International Preliminary Report issued by the International Bureau on Oct. 30, 2012 for PCT/EP2011/056672 filed Apr. 27, 2011 and published as WO 2011/135004 on Nov. 3, 2011 (Applicants—Borealis AG; Inventors—Resconi, et al.) (7 pages).
International Search Report mailed by the International Bureau on Aug. 23, 2012 for PCT/EP2011/056672 filed Apr. 27, 2011 and published as WO 2011/135004 on Nov. 3, 2011 (Applicants—Borealis AG; Inventors—Resconi, et al.) (5 pages).
Written Opinion mailed by the International Bureau on Aug. 23, 2012 for PCT/EP2011/056672 filed Apr. 27, 2011 and published as WO 2011/135004 on Nov. 3, 2011 (Applicants—Borealis AG; Inventors—Resconi, et al.) (6 pages).
International Preliminary Report on Patentability issued on Oct. 30, 2012 for PCT/EP2011/056673 field on Apr. 27, 2011 and published as WO 2011/135005 on Nov. 3, 2011 (Applicant—Borealis AG; Inventors—Resconi, et al.) (8 pages).
International Search Report mailed on Jan. 13, 2012 for PCT/EP2011/056673 filed on Apr. 27, 2011 and published as WO 2011/135005 on Nov. 3, 2011 (Applicant—Borealis AG; Inventors—Resconi, et al.) (5 pages).
Written Opinion mailed on Jan. 13, 2012 for PCT/EP2011/056673 filed on Apr. 27, 2011 and published as WO 2011/135005 on Nov. 3, 2011 (Applicant—Borealis AG; Inventors—Resconi, et al.) (7 pages).
Preliminary Amendment filed with the USPTO on Oct. 26, 2012 for U.S. Appl. No. 13/643,865, filed Feb. 7, 2013 (Applicant—Borealis AG; Inventors—Resconi, et al.) (10 pages).
Notice of Allowance issued on Jan. 3, 2014, for U.S. Appl. No. 13/643,865, filed Feb. 7, 2013 (8 pages).
Issue Notification issued on Apr. 30, 2014, for U.S. Appl. No. 13/643,865, filed Feb. 7, 2013 (1 page).

* cited by examiner

*Primary Examiner* — Caixia Lu
(74) *Attorney, Agent, or Firm* — Ballard Spahr LLP

(57) ABSTRACT

Solid, particulate catalysts comprising bridged bis indenyl π-ligands are disclosed, together with methods for the preparation and use thereof, for example, in olefin polymerization.

17 Claims, No Drawings

SOLID PARTICULATE CATALYSTS COMPRISING BRIDGED METALLOCENES

CROSS-REFERENCE TO RELATED APPLICATIONS

The present application is a U.S. National Phase Application of International Application No. PCT/EP2011/056672, filed Apr. 27, 2011, which claims priority to European Patent Application No. 10161364.4, filed Apr. 28, 2010, all of which applications are incorporated herein fully by this reference.

This invention relates to catalysts comprising bridged bis indenyl Π-ligands useful in the formation of olefin polymerisation catalysts, as well as the use thereof in olefin polymerisation. In particular, the invention relates to catalysts which comprise certain bridged bis indenyl complexes in solid form, and especially in solid form but without the use of an external support.

Metallocene catalysts have been used to manufacture polyolefins for many years. Countless academic and patent publications describe the use of these catalysts in olefin polymerisation. Metallocenes are now used industrially and polyethylenes and polypropylenes in particular are often produced using cyclopentadienyl based catalyst systems having different substitution patterns.

These metallocenes can be used in solution polymerisation or they can be carried on conventional supports such as silica.

In WO03/051934, the inventors proposed an alternative form of catalyst which is provided in solid form but does not require a conventional external carrier material such as silica. The invention is based on the finding that a homogeneous catalyst system containing an organometallic compound of a transition metal can be converted, in a controlled way, to solid, uniform catalyst particles by first forming a liquid/liquid emulsion system, which comprises a homogeneous solution of catalyst components as the dispersed phase, and as the continuous phase solvent where the catalyst solution is as dispersed droplets therewith, and then solidifying said dispersed droplets to form solid particles comprising the said catalyst.

The invention described in WO03/051934 enabled the formation of solid spherical catalyst particles of said organotransition metal catalyst without using e.g. external porous carrier particles, such as silica, normally required in the art. It could be seen that catalyst particles having improved morphology, will give, due to the replica effect, polymer particles having improved morphology.

Although a lot of work has been done in the field of metallocene catalysts, both with conventional supported catalysts as well with solid catalysts prepared according to the principles as described in WO03/051934, there remain still some problems, which relate especially to the productivity or activity of catalysts manufactured in this way. In particular, the productivity or activity of these catalysts has been found to be relatively low, especially when polymers of low melt flow rate (i.e. high molecular weight) are produced using known catalysts.

Furthermore, there is a need for better polymer properties than can be achieved using existing catalysts. For example, while one direction of development of new catalysts has been, and still is, aimed at increasing the catalyst stereoselectivity, that is at obtaining polypropylenes of higher isotacticity and higher stiffness, another equally important line of development has been aimed at finding catalysts able to produce polypropylenes of lower chain regularity by introducing controlled amounts of stereoerrors or regioerrors randomly distributed in the polymer chains, in order to obtain polypropylenes of lower melting point but still free of a fully amorphous, soluble fraction.

In the case of regioerrors, the influence of such chain defects has so far only been measured on polypropylenes with very low amounts of such defects, as described, for example, in Macromolecules 2005, 38, 9143-9154. In order to obtain polypropylenes with high crystallinity but lower melting points, the amount of such defects needs to be increased. An especially desired and useful combination of polypropylene properties, not yet described in the art, would be low MFR (that is high molecular weight) combined with a high amount of regiodefects.

Thus, there remains a need to find new catalysts having an improved activity, especially in the desired MFR area, and which further have some desired polymer properties. The present inventors were faced especially with the problems as disclosed above. In addition, it is highly desired that the catalyst has a good activity when lower hydrogen concentrations are used in a polymerisation, i.e. polymers with lower MFR are produced.

The present inventors have found a new class of olefin polymerisation catalysts not previously described in the art, and which are able to solve the problems disclosed above. The inventors have found that using special metallocene complexes as disclosed in WO2007/116034 in solid form, these problems can be solved. In said WO2007/116034, the complexes are targeted and used only in connection with homogeneous catalysis. There is a general reference to conventional supported catalysts, but no exemplification is offered.

The present invention combines the catalyst solidification techniques of WO03/051934 with some metallocene complexes of said WO2007/116034. The resulting solid, particulate catalyst of the invention, exhibits remarkably superior properties than known catalysts.

Thus, some of the complexes used in the manufacture of the catalysts of the invention are not, as such, new. No-one before has considered the benefits of using these particular catalysts in solid form, and especially not in solid form but without an external support. The resulting catalyst surprisingly provides the desired increase in regioerrors at low MFR values. Moreover, the catalyst of the invention is able to provide characteristics in the formed polymer not previously associated with catalysts in solid form.

In particular, catalyst activity is very high, especially with low hydrogen concentrations (i.e. when polymers with low MFR, i.e. higher molecular weight, Mw are produced) within the polymerisation reactor compared to the homogeneous catalysts of WO2007/116034. Similarly therefore $MFR_2$ and $MFR_{21}$ are lower at a given hydrogen concentration relative to other known solid but unsupported catalysts. Intrinsic viscosity is also a measure of molecular weight, i.e. higher viscosity indicates higher molecular weight and the catalysts of the invention provide polymers of high intrinsic viscosity relative to other known solid but unsupported catalysts under the same polymerisation conditions.

It has also been seen that the amount of regioerrors is higher with the catalysts of the present invention compared to the homogeneous catalysts. These catalysts are therefore able to make polymers of lower melting point, but still of high isotacticity. Moreover, the polymers formed by the catalysts of the invention have low xylene soluble content.

Thus, viewed from one aspect the invention provides a solid, particulate catalyst, preferably free from an external carrier, comprising:

(i) a complex of formula (I):

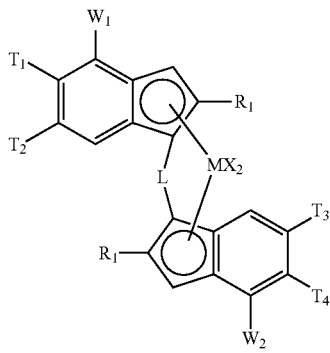

(I)

wherein

M is zirconium or hafnium;

each X is a sigma ligand;

L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom, C1-C20-alkyl, tri(C1-C20-alkyl)silyl, C6-C20-aryl, C7-C20-arylalkyl or C7-C20-alkylaryl;

each $R_1$ independently is a linear or branched C1-C20 hydrocarbyl radical optionally containing one or more heteroatoms from groups 14-16;

$T_1$ and $T_4$, which can be the same or different, are an $OR^2$, $SR^2$, $CH(R^{18})_2$, $CH_2R^{18}$, aryl or heteroaryl group;

each $R^2$, which can be the same or different, is a C1-C20 hydrocarbyl radical;

each $R^{18}$, which can be the same or different, is a C1-C20 hydrocarbyl radical or two $R^{18}$ groups together with the carbon atom to which they are attached may form a cyclic C4-C20 hydrocarbyl group;

$T_2$ and $T_3$, which may be the same or different, are a $C(R^{18})_3$ group;

$W_1$ and $W_2$, which may be the same or different, are a 5 or 6 membered aryl or heteroaryl ring wherein each atom of said ring is optionally substituted with an $R^5$ group;

each $R^5$, which can be the same or different, is a C1-C20 hydrocarbyl radical optionally containing one or more heteroatoms belonging to groups 14-16; and optionally two adjacent $R^5$ groups taken together can form a further mono or multicyclic ring condensed to $W_1$ or $W_2$, optionally substituted by one or two groups $R_5$;

and (ii) a cocatalyst.

In particular, the invention provides a solid, particulate catalyst free of external carrier and comprising (i) a complex of formula (I) as defined above and (ii) a cocatalyst, and especially being a catalyst obtainable by a process in which (I) a liquid/liquid emulsion system is formed, said liquid/liquid emulsion system comprising a solution of the catalyst components (i) and (ii) dispersed in a solvent so as to form dispersed droplets therewith; and (II) solid particles are formed by solidifying said dispersed droplets.

Viewed from another aspect the invention provides a process for the manufacture of a catalyst as hereinbefore defined comprising obtaining a complex of formula (I) as hereinbefore described and a cocatalyst;

forming a liquid/liquid emulsion system containing dispersed droplets which comprises a solution of catalyst components (i) and (ii) dispersed in a solvent, and solidifying said dispersed droplets to form solid particles.

Viewed from another aspect the invention provides the use in olefin polymerisation of a catalyst as hereinbefore defined.

Viewed from another aspect the invention provides a process for the polymerisation of at least one olefin comprising reacting said at least one olefin with a catalyst as hereinbefore described.

DEFINITIONS

Throughout the description the following definitions are employed.

By free from an external carrier is meant that the catalyst does not contain an external inorganic or organic support such as silica or alumina or polymeric support material.

By particulate is meant that the catalyst material of the invention exists as particles, typically as a free flowing powder, typically of around 1 to 500 μm in diameter.

The term $C_{1-20}$ hydrocarbyl group covers any $C_{1-20}$ group comprising carbon and hydrogen only. Any $C_{1-20}$ hydrocarbyl group is preferably a $C_{1-15}$ hydrocarbyl group, more preferably a $C_{1-10}$ hydrocarbyl group, especially a $C_{1-6}$ hydrocarbyl group.

The term $C_{1-20}$ hydrocarbyl group therefore includes $C_{1-20}$ alkyl, $C_{2-20}$ alkenyl, $C_{2-20}$ alkynyl, $C_{3-20}$ cycloalkyl, $C_{3-20}$ cycloalkenyl, $C_{6-20}$ aryl groups, $C_{7-20}$ alkylaryl groups or $C_{7-20}$ arylalkyl groups.

Unless otherwise stated, preferred $C_{1-20}$ hydrocarbyl groups are $C_{1-20}$ alkyl groups or $C_{6-20}$ aryl groups, especially $C_{1-10}$ alkyl groups or $C_{6-10}$ aryl groups, e.g. $C_{1-6}$ alkyl groups. Most especially preferred hydrocarbyl groups are methyl, ethyl, propyl, isopropyl, tertbutyl, phenyl or benzyl.

The term aryl preferably means C6-10 aryl optionally substituted with one or two $C_{1-6}$alkyl groups, e.g. methyl or tertbutyl groups.

The term halogen includes fluoro, chloro, bromo and iodo groups, especially chloro groups, when relating to the complex definition.

The term heteroaryl means a monocyclic aromatic ring structure comprising at least one heteroatom. Preferred heteroaryl groups have 1 to 4 heteroatoms selected from O, S and N. Preferred heteroaryl groups include furanyl, thiophenyl, oxazole, thiazole, isothiazole, isooxazole, triazole and pyridyl.

Any group including "one or more heteroatoms belonging to groups 14-16" preferably means Si, O, S or N. N groups may present as —NH— or —NR"— where R" is C1-10 alkyl.

The oxidation state of the metal ion is governed primarily by the nature of the metal ion in question and the stability of the individual oxidation states of each metal ion. Typically, however the metal ions will be in the 3+ or 4+ oxidation state especially 4+.

It will be appreciated that in the complexes of the invention, the metal ion M is coordinated by ligands X so as to satisfy the valency of the metal ion and to fill its available coordination sites. The nature of these σ-ligands can vary greatly.

The solvent, where the catalyst solution is dispersed can be immiscible or at least not totally miscible with the catalyst solution phase.

DETAILED DESCRIPTION OF INVENTION

It is preferred if the two multicyclic ligands making up the complex of formula (I) are identical. It is also preferred if a substituent on one ring is the same as the corresponding substituent on the other. Thus, both $R_1$'s are preferably the same and so on. Preferably, the metallocene compounds of the present invention are in their racemic (rac) or racemic-anti-form.

M is preferably zirconium Zr.

Each X, which may be the same or different, is preferably a hydrogen atom, a halogen atom, a R, OR, $OSO_2CF_3$, OCOR, SR, $NR_2$ or $PR_2$ group wherein R is a linear or branched, cyclic or acyclic, C1-C20-alkyl, C2-C20 alkenyl, C2-C20 alkynyl, C6-C20-aryl, C7-C20-alkylaryl or C7-C20-arylalkyl radical; optionally containing heteroatoms belonging to groups 14-16 or is $SiR_3$, $SiHR_2$ or $SiH_2R$. R is preferably a C1-6 alkyl, phenyl or benzyl group.

Most preferably each X is independently a hydrogen atom, a halogen atom, C1-6-alkoxy group or an R group, e.g. preferably a C1-6 alkyl, phenyl or benzyl group. Most preferably X is chlorine or a methyl radical. Preferably both X groups are the same.

L is preferably a bridge comprising one or two heteroatoms, such as silicon or germanium atom(s), e.g. —$SiR^6_2$—, wherein each $R^6$ is independently C1-C20-alkyl, C6-C20-aryl or a tri(C1-C20-alkyl)silyl-residue, such as trimethylsilyl. More preferably $R^6$ is $C_{1-6}$-alkyl, especially methyl. L may also be an $C_{1-4}$-alkylene linkage, e.g. ethylene. Most preferably, L is a 1 or 2 atom bridge, especially a dimethylsilyl or ethylene bridge.

$R^1$ is preferably a linear or branched C1-20-alkyl, C2-C20 alkenyl, C2-C20 alkynyl radical or an aryl or arylalkyl radical containing from 4 to 20 carbon atoms optionally containing O, N, S, P or Si atoms, in particular O, N and S atoms such as 2-(5-Me-thiophenyl) or 2-(5-Me-furanyl) radicals.

More preferably $R^1$ is a linear or branched C1-10-alkyl radical, like a linear or branched C1-6-alkyl radical. $R^1$ is ideally linear C1-6 alkyl radical, preferably a methyl or ethyl radical.

Preferably $T_1$ and $T_4$ are an $OR^2$ or an $SR^2$ group or a C5-10 aryl or heteroaryl group, e.g. phenyl, cumyl or tolyl.

Preferably $R^2$ is a linear or branched, cyclic or acyclic, C1-C20-alkyl, C2-C20 alkenyl, C2-C20 alkynyl, C6-C20-aryl. More preferably $R^2$ is a linear or branched C1-C10-alkyl radical, such as methyl, ethyl, isopropyl or tertbutyl.

Most preferably $T_1$ and $T_4$ are $OC_{1-6}$ alkyl especially methoxy or ethoxy. It is preferred if $T_1$ and $T_4$ are the same.

Preferably $R^{18}$ is a linear or branched, cyclic or acyclic, C1-20-alkyl, C2-C20 alkenyl, C2-C20 alkynyl, C6-C20-aryl, C7-C20-alkylaryl or C7-C20-arylalkyl radical, optionally containing one or more heteroatoms belonging to groups 14-16.

More preferably $R^{18}$ is a linear or branched, C1-10-alkyl radical. More preferably $R^{18}$ is a methyl or ethyl radical.

In a further preferred embodiment two $R^{18}$ groups along with the carbon atom to which they are attached form a C4-20 hydrocarbyl ring system, preferably a C5 to 10 ring system. Preferred rings are mono or bicyclic preferably monocyclic. Preferred rings are saturated or unsaturated, especially saturated. Most preferred rings are cyclopentyl or cyclohexyl.

$T_2$ and $T_3$ are preferably C4-C10 branched tertiary alkyl or two $R^{18}$ groups are a C4-10 cycloalkyl with the remaining $R^{18}$ group being C1-10 alkyl. Preferred options include, tert-butyl, 1-alkylcyclopentyl or 1-alkylcyclohexyl.

$W_1$ and $W_2$ are preferably the same. They are preferably an optional substituted phenyl group, or a 5 or 6 membered heteroaryl group such as a furanyl, thiophenyl, pyrrolyl, triazolyl and pyridyl.

Any five membered heteroaryl group should preferably comprise one heteroatom in the ring, such as O, N or S, preferably S.

Preferably $W_1$ and $W_2$ are a phenyl derivative or thiophenyl derivative. More preferably the phenyl/thiophene derivative is unsubstituted or carries one substituent.

The optional substitutent on any $W_1$ or $W_2$ group is $R^5$. If present, there should be 1 or 2 $R^5$ groups, preferably one $R^5$ group.

Preferably $R^5$ is a linear or branched, cyclic or acyclic, C1-C20-alkyl, C2-C20 alkenyl, C2-C20 alkynyl, C6-C20-aryl, C7-C20-alkylaryl or C7-C20-arylalkyl radical optionally containing one or more heteroatoms belonging to groups 14-16. Preferably $R^5$ is a C1-C6 alkyl such as methyl, isopropyl or tertbutyl.

In one preferred embodiment two adjacent $R^5$ groups taken together can form a further mono or multicyclic ring condensed to $W_1$ or $W_2$. The new ring is preferably 5 or 6 membered or the $R^5$ groups preferably form two new rings such a one further five membered and six membered ring.

The new ring or rings can be aliphatic or aromatic. Preferably any new ring forms an aromatic system with the $W_1$ or $W_2$ ring to which it is attached.

In this way groups such as carbazolyl, benzothiophenyl and naphthyl can be formed at position $W_1$ or $W_2$. It is also within the scope of the invention for these new rings to be substituted by 1 or 2 $R^5$ groups (in which the option of two adjacent $R^5$ groups forming another ring is excluded).

Highly preferably therefore $R^5$ is a linear or branched, cyclic or acyclic, C1-C10-alkyl group or two adjacent $R^5$ groups taken together can form a further mono or multicyclic aromatic ring condensed to $W_1$ and/or $W_2$.

In a most preferred embodiment, $W_1$ and $W_2$ are a phenyl group optionally carrying one $R^5$ substituent. Preferably that substituent is carried para to the bond to the indenyl ring.

In a preferred embodiment therefore the complex of the invention is of formula (II)

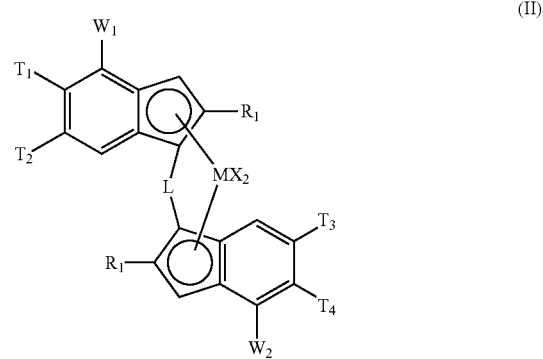

(II)

wherein
M is Zr or Hf, preferably Zr;
$R_1$ is a linear or branched C1-C10 alkyl;
L is ethylene or $SiR^6_2$;
$R^6$ is C1-C10 alkyl;
each X is a hydrogen atom, a halogen atom, an OR, or an R group;
R is methyl, ethyl, isopropyl, trimethylsilyl, or a C6-C10 aryl, preferably X is chlorine or methyl;
$W_1$ and $W_2$ are a phenyl derivative or thiophenyl derivative optionally carrying one or two $R^5$ groups.
$R^5$ is C1-C10 alkyl or two adjacent $R^5$ groups taken together can form a further mono or multicyclic ring condensed to $W_1$ or $W_2$ e.g. so as to form a benzothiophenyl group;

$T_1$ is $OC_1$-$C_6$ alkyl or a $C_6$-$C_{10}$ aryl;
$T_2$ is $C_4$-$C_{10}$ hydrocarbyl, preferably tertiary hydrocarbyl such as tert-butyl;
$T_3$ is $C_4$-$C_{10}$ hydrocarbyl, preferably tertiary hydrocarbyl such as tert-butyl; and
$T_4$ is $OC_1$-$C_6$ alkyl or a $C_6$-$C_{10}$ aryl;

In a preferred embodiment the complex of the invention is of formula (III)

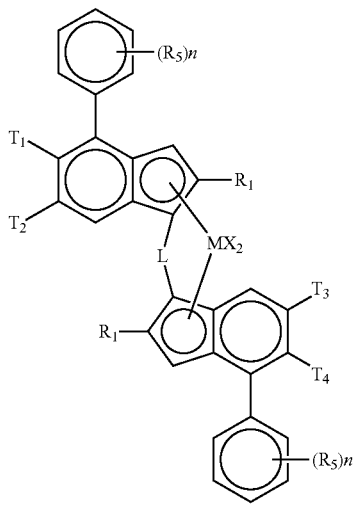

(III)

wherein

M is Zr or Hf, preferably Zr;
$R_1$ is a linear or branched C1-C10 alkyl;
L is ethylene or $SiR^6_2$;
$R^6$ is C1-C10 alkyl;
Each X is a hydrogen atom, a halogen atom, an OR, or an R group;
R is methyl, ethyl, isopropyl, trimethylsilyl, or a C6-C10 aryl, preferably X is chlorine or methyl
n is 0 to 2;
$R^5$ is C1-C10 alkyl;
$T_1$ is O—C1-C6 alkyl or a C6-C10 aryl;
$T_2$ is $C_4$-$C_{10}$ hydrocarbyl, preferably tertiary hydrocarbyl such as tert-butyl;
$T_3$ is $C_4$-$C_{10}$ hydrocarbyl, preferably tertiary hydrocarbyl such as tert-butyl; and
$T_4$ is O—C1-C6 alkyl or a C6-C10 aryl.

Examples of compounds having formula (I) are as follows
racemic-Me$_2$Si(2-methyl-4-phenyl-5-methoxy-6-tert-butylinden-1-yl)$_2$ZrCl$_2$
racemic-Me$_2$Si(2-methyl-4-(thiophen-2-yl)-5-methoxy-6-tert-butylinden-1-yl)$_2$ZrCl$_2$
racemic-Me$_2$Si(2-methyl-4-(5-methylthiophen-2-yl)-5-methoxy-6-tert-butylinden-1-yl)$_2$ZrCl$_2$
racemic-Me$_2$Si(2-methyl-4-(benzothiophen-2-yl)-5-methoxy-6-tert-butylinden-1-yl)$_2$ZrCl$_2$
racemic-Me$_2$Si(2-methyl-4-(benzothiophen-2-yl)-5-methoxy-6-tert-butylinden-1-yl)$_2$ZrCl$_2$
racemic-Me$_2$Si(2-methyl-4-(4-pyridyl)-5-methoxy-6-tert-butylinden-1-yl)$_2$ZrCl$_2$
racemic-Me$_2$Si(2-methyl-4-(tert-butylphenyl)-5-methoxy-6-tert-butylinden-1-yl)$_2$ZrCl$_2$
racemic-Me$_2$Si(2-methyl-4-(tert-butylphenyl)-5-ethoxy-6-tert-butylinden-1-yl)$_2$ZrCl$_2$
racemic-Me$_2$Si(2-methyl-4-(2,5-dimethylphenyl)-5-methoxy-6-tert-butylinden-1-yl)$_2$ZrCl$_2$
racemic-Me$_2$Si(2-ethyl-4-phenyl-5-methoxy-6-tert-butylinden-1-yl)$_2$ZrCl$_2$
racemic-Me$_2$Si(2-propyl-4-phenyl-5-methoxy-6-tert-butylinden-1-yl)$_2$ZrCl$_2$
racemic-anti-Me$_2$Si(2-methyl-4-phenyl-5-methoxy-6-tert-butylinden-1-yl)(2-methyl-4-(5-methylthiophen-2-yl)-5-methoxy-6-tert-butylinden-1-yl)ZrCl$_2$;
racemic-anti-Me$_2$Si(2-methyl-4-phenyl-5-methoxy-6-tert-butylinden-1-yl)(2-methyl-445-methylthiophen-2-yl)-5-ethoxy-6-tert-butylinden-1-yl)ZrCl$_2$
racemic-anti-Me$_2$Si(2-methyl-4-phenyl-5-methoxy-6-tert-butylinden-1-yl)(2-isopropyl-4-phenyl-5-methoxy-6-tert-butylinden-1-yl)ZrCl$_2$
racemic-Me$_2$Si(2-methyl-4-phenyl-5-methoxy-6-(1-methylcyclohexyl)inden-1-yl)$_2$ZrCl$_2$
and their correspondent dimethyl derivatives and further the corresponding hafnium compounds.

Throughout the disclosure above, where a narrower definition of a substituent is presented, that narrower definition is deemed disclosed in conjunction with all broader and narrower definitions of other substituents in the application.

Synthesis

The ligands required to form the catalysts of the invention can be synthesised by any process and the skilled organic chemist would be able to devise various synthetic protocols for the manufacture of the necessary ligand materials. WO2007/116034 discloses the necessary chemistry and is herein incorporated by reference.

Cocatalyst

To form an active catalytic species it is normally necessary to employ a cocatalyst as is well known in the art. Cocatalysts comprising an organometal compound of Group 13 metal, like organoaluminium compounds used to activate metallocene catalysts are suitable for use in this invention.

The olefin polymerisation catalyst system of the invention comprises (i) a complex in which the metal ion is coordinated by a ligand of the invention; and normally (ii) an aluminium alkyl compound (or other appropriate cocatalyst), or the reaction product thereof. Thus the cocatalyst is preferably an alumoxane, like MAO or an alumoxane other than MAO.

Alternatively, however, the catalysts of the invention may be used with other cocatalysts, e.g. boron compounds such as $B(C_6F_5)_3$, $C_6H_5N(CH_3)_2H$:$B(C_6F_5)_4$, $(C_6H_5)_3C$:$B(C_6F_5)_4$ or $Ni(CN)_4[B(C_6F_5)_3]_4{}^{2-}$. The use of aluminoxanes, especially MAO, is highly preferred.

Manufacture

The catalyst of the invention is a solid, and preferably no external carrier is used. In order to provide the catalyst of the invention in solid, particulate form but without using an external carrier, it is preferred if a liquid liquid emulsion system is used. This process involves dispersing catalyst components (i) and (ii) in a solvent to form dispersed droplets, and solidifying said dispersed droplets to form solid particles.

In particular, the method involves preparing a solution of one or more catalyst components; dispersing said solution in a solvent to form an emulsion in which said one or more catalyst components are present in the droplets of the dispersed phase; immobilising the catalyst components in the dispersed droplets, in the absence of an external particulate porous support, to form solid particles comprising the said catalyst, and optionally recovering said particles.

This process enables the manufacture of active catalyst particles with improved morphology, e.g. with a predetermined spherical shape and particle size and without using any added external porous support material, such as an inorganic oxide, e.g. silica. Also desirable surface properties can be obtained.

By the term "preparing a solution of one or more catalyst components" is meant that the catalyst forming compounds may be combined in one solution which is dispersed to the immiscible solvent, or, alternatively, at least two separate catalyst solutions for each part of the catalyst forming compounds may be prepared, which are then dispersed successively to the solvent.

In a preferred method for forming the catalyst at least two separate solutions for each part of said catalyst may be prepared, which are then dispersed successively to the immiscible solvent.

More preferably, a solution of the complex comprising the transition metal compound and the cocatalyst is combined with the solvent, to form an emulsion wherein that inert solvent forms the continuous liquid phase and the solution comprising the catalyst components forms the dispersed phase (discontinuous phase) in the form of dispersed droplets. The droplets are then solidified to form solid catalyst particles, and the solid particles are separated from the liquid and optionally washed and/or dried. The solvent forming the continuous phase may be immiscible to the catalyst solution at least at the conditions (e.g. temperatures) used during the dispersing step.

Full disclosure of the necessary process can be found in WO03/051934 which is herein incorporated by reference.

The inert solvent must be chemically inert. Preferably, the solvent of said continuous phase does not contain dissolved therein any significant amounts of catalyst forming compounds. Thus, the solid particles of the catalyst are formed in the droplets from the compounds which originate from the dispersed phase (i.e. are provided to the emulsion in a solution dispersed into the continuous phase).

The terms "immobilisation" and "solidification" are used herein interchangeably for the same purpose, i.e. for forming free flowing solid catalyst particles in the absence of an external porous particulate carrier, such as silica. The solidification happens thus within the droplets. Said step can be effected in various ways as disclosed in said WO03/051934 Preferably solidification is caused by an external stimulus to the emulsion system such as a temperature change to cause the solidification. Thus in said step the catalyst component (s) remain "fixed" within the formed solid particles. It is also possible that one or more of the catalyst components may take part in the solidification/immobilisation reaction.

Accordingly, solid, compositionally uniform particles having a predetermined particle size range can be obtained.

Furthermore, the particle size of the catalyst particles of the invention can be controlled by the size of the droplets in the solution, and spherical particles with an uniform particle size distribution can be obtained.

The invention is also industrially advantageous, since it enables the preparation of the solid particles to be carried out as a one-pot procedure. Continuous or semicontinuous processes are also possible for producing the catalyst.

Dispersed Phase

The principles for preparing two phase emulsion systems are known in the chemical field. Thus, in order to form the two phase liquid system, the solution of the catalyst component (s) and the solvent used as the continuous liquid phase have to be essentially immiscible at least during the dispersing step. This can be achieved in a known manner e.g. by choosing said two liquids and/or the temperature of the dispersing step/solidifying step accordingly.

A solvent may be employed to form the solution of the catalyst component (s). Said solvent is chosen so that it dissolves said catalyst component (s). The solvent can be preferably an organic solvent such as used in the field, comprising an optionally substituted hydrocarbon such as linear or branched aliphatic, alicyclic or aromatic hydrocarbon, such as a linear or cyclic alkane, an aromatic hydrocarbon and/or a halogen containing hydrocarbon.

Examples of aromatic hydrocarbons are toluene, benzene, ethylbenzene, propylbenzene, butylbenzene and xylene. Toluene is a preferred solvent. The solution may comprise one or more solvents. Such a solvent can thus be used to facilitate the emulsion formation, and usually does not form part of the solidified particles, but e.g. is removed after the solidification step together with the continuous phase.

Alternatively, a solvent may take part in the solidification, e.g. an inert hydrocarbon having a high melting point (waxes), such as above 40° C., suitably above 70° C., e.g. above 80° C. or 90° C., may be used as solvents of the dispersed phase to immobilise the catalyst compounds within the formed droplets.

In another embodiment, the solvent consists partly or completely of a liquid monomer, e.g. liquid olefin monomer designed to be polymerised in a "prepolymerisation" immobilisation step.

Continuous Phase

The solvent used to form the continuous liquid phase is a single solvent or a mixture of different solvents and may be immiscible with the solution of the catalyst components at least at the conditions (e.g. temperatures) used during the dispersing step. Preferably said solvent is inert in relation to said compounds.

The term "inert in relation to said compounds" means herein that the solvent of the continuous phase is chemically inert, i.e. undergoes no chemical reaction with any catalyst forming component. Thus, the solid particles of the catalyst are formed in the droplets from the compounds which originate from the dispersed phase, i.e. are provided to the emulsion in a solution dispersed into the continuous phase.

It is preferred that the catalyst components used for forming the solid catalyst will not be soluble in the solvent of the continuous liquid phase. Preferably, said catalyst components are essentially insoluble in said continuous phase forming solvent.

Solidification takes place essentially after the droplets are formed, i.e. the solidification is effected within the droplets e.g. by causing a solidifying reaction among the compounds present in the droplets. Furthermore, even if some solidifying agent is added to the system separately, it reacts within the droplet phase and no catalyst forming components go into the continuous phase.

The term "emulsion" used herein covers both bi- and multiphasic systems.

In a preferred embodiment said solvent forming the continuous phase is an inert solvent including a halogenated organic solvent or mixtures thereof, preferably fluorinated organic solvents and particularly semi, highly or perfluorinated organic solvents and functionalised derivatives thereof. Examples of the above-mentioned solvents are semi, highly or perfluorinated hydrocarbons, such as alkanes, alkenes and cycloalkanes, ethers, e.g. perfluorinated ethers and amines, particularly tertiary amines, and functionalised derivatives thereof. Preferred are semi, highly or perfluorinated, particularly perfluorinated hydrocarbons, e.g. perfluorohydrocarbons of e.g. C3-C30, such as C4-C10. Specific examples of suitable perfluoroalkanes and perfluorocycloalkanes include perfluoro-hexane, -heptane, -octane and -(methylcyclohexane). Semi fluorinated hydrocarbons relates particularly to semifluorinated n-alkanes.

"Semi fluorinated" hydrocarbons also include such hydrocarbons wherein blocks of —C—F and —C—H alternate. "Highly fluorinated" means that the majority of the —C—H units are replaced with —C—F units. "Perfluorinated" means that all —C—H units are replaced with —C—F units. See the articles of A. Enders and G. Maas in "Chemie in unserer Zeit", 34. Jahrg. 2000, Nr. 6, and of Pierandrea Lo Nostro in "Advances in Colloid and Interface Science", 56 (1995) 245-287, Elsevier Science.

Dispersing Step

The emulsion can be formed by any means known in the art: by mixing, such as by stirring said solution vigorously to said solvent forming the continuous phase or by means of mixing mills, or by means of ultra sonic wave, or by using a so called phase change method for preparing the emulsion by first forming a homogeneous system which is then transferred by changing the temperature of the system to a biphasic system so that droplets will be formed.

The two phase state is maintained during the emulsion formation step and the solidification step, as, for example, by appropriate stirring.

Additionally, emulsifying agents/emulsion stabilisers can be used, preferably in a manner known in the art, for facilitating the formation and/or stability of the emulsion. For the said purposes e.g. surfactants, e.g. a class based on hydrocarbons (including polymeric hydrocarbons with a molecular weight e.g. up to 10 000 and optionally interrupted with a heteroatom(s)), preferably halogenated hydrocarbons, such as semi- or highly fluorinated hydrocarbons optionally having a functional group selected e.g. from —OH, —SH, $NH_2$, $NR''_2$. —COOH, —$COONH_2$, oxides of alkenes, —CR''=$CH_2$, where R" is hydrogen, or C1-C20 alkyl, C2-20-alkenyl or C2-20-alkynyl group, oxo-groups, cyclic ethers and/or any reactive derivative of these groups, like alkoxy, or carboxylic acid alkyl ester groups, or, preferably semi-, highly- or perfluorinated hydrocarbons having a functionalised terminal, can be used. The surfactants can be added to the catalyst solution, which forms the dispersed phase of the emulsion, to facilitate the forming of the emulsion and to stabilize the emulsion.

Alternatively, an emulsifying and/or emulsion stabilising aid can also be formed by reacting a surfactant precursor bearing at least one functional group with a compound reactive with said functional group and present in the catalyst solution or in the solvent. The obtained reaction product acts as the actual emulsifying aid and or stabiliser in the formed emulsion system.

Examples of the surfactant precursors usable for forming said reaction product include e.g. known surfactants which bear at least one functional group selected e.g. from —OH, —SH, $NH_2$, $NR''_2$. —COOH, —$COONH_2$, oxides of alkenes, —CR''=$CH_2$, where R" is hydrogen, or C1-C20 alkyl, C2-20-alkenyl or C2-20-alkynyl group, oxo-groups, cyclic ethers with 3 to 5 ring atoms, and/or any reactive derivative of these groups, like alkoxy or carboxylic acid alkyl ester groups; e.g. semi-, highly or perfluorinated hydrocarbons bearing one or more of said functional groups. Preferably, the surfactant precursor has a terminal functionality as defined above.

The compound reacting with such surfactant precursor is preferably contained in the catalyst solution and may be a further additive or one or more of the catalyst forming compounds. Such compound is e.g. a compound of group 13 (e.g. MAO and/or an aluminium alkyl compound) and/or a transition metal compound.

If a surfactant precursor is used, it is preferably first reacted with a compound of the catalyst solution before the addition of the transition metal compound. In one embodiment e.g. a highly fluorinated C1-n (suitably C4-30- or C5-15) alcohol (e.g. highly fluorinated heptanol, octanol or nonanol), oxide (e.g. propenoxide) or acrylate ester is reacted with a cocatalyst to form the "actual" surfactant. Then, an additional amount of cocatalyst and the transition metal compound is added to said solution and the obtained solution is dispersed to the solvent forming the continuous phase. The "actual" surfactant solution may be prepared before the dispersing step or in the dispersed system. If said solution is made before the dispersing step, then the prepared "actual" surfactant solution and the transition metal solution may be dispersed successively (e.g. the surfactant solution first) to the immiscible solvent, or be combined together before the dispersing step.

Solidification

The solidification of the catalyst component(s) in the dispersed droplets can be effected in various ways, e.g. by causing or accelerating the formation of said solid catalyst forming reaction products of the compounds present in the droplets. This can be effected, depending on the used compounds and/or the desired solidification rate, with or without an external stimulus, such as a temperature change of the system.

In a particularly preferred embodiment, the solidification is effected after the emulsion system is formed by subjecting the system to an external stimulus, such as a temperature change. Temperature differences of e.g. 5 to 100° C., such as 10 to 100° C., or 20 to 90° C., such as 50 to 90° C.

The emulsion system may be subjected to a rapid temperature change to cause a fast solidification in the dispersed system. The dispersed phase may e.g. be subjected to an immediate (within milliseconds to few seconds) temperature change in order to achieve an instant solidification of the component (s) within the droplets. The appropriate temperature change, i.e. an increase or a decrease in the temperature of an emulsion system, required for the desired solidification rate of the components cannot be limited to any specific range, but naturally depends on the emulsion system, i.e. on the used compounds and the concentrations/ratios thereof, as well as on the used solvents, and is chosen accordingly. It is also evident that any techniques may be used to provide sufficient heating or cooling effect to the dispersed system to cause the desired solidification.

In one embodiment the heating or cooling effect is obtained by bringing the emulsion system with a certain temperature to an inert receiving medium with significantly different temperature, e.g. as stated above, whereby said temperature change of the emulsion system is sufficient to cause the rapid solidification of the droplets. The receiving medium can be gaseous, e.g. air, or a liquid, preferably a solvent, or a mixture of two or more solvents, wherein the catalyst component (s) is (are) immiscible and which is inert in relation to the catalyst component (s). For instance, the receiving medium comprises the same immiscible solvent used as the continuous phase in the first emulsion formation step.

Said solvents can be used alone or as a mixture with other solvents, such as aliphatic or aromatic hydrocarbons, such as alkanes. Preferably a fluorinated solvent as the receiving medium is used, which may be the same as the continuous phase in the emulsion formation, e.g. perfluorinated hydrocarbon.

Alternatively, the temperature difference may be effected by gradual heating of the emulsion system, e.g. up to 10° C. per minute, preferably 0.5 to 6° C. per minute and more preferably in 1 to 5° C. per minute.

In case a melt of e.g. a hydrocarbon solvent is used for forming the dispersed phase, the solidification of the droplets may be effected by cooling the system using the temperature difference stated above.

Preferably, the "one phase" change as usable for forming an emulsion can also be utilised for solidifying the catalytically active contents within the droplets of an emulsion system by, again, effecting a temperature change in the dispersed system, whereby the solvent used in the droplets becomes miscible with the continuous phase, preferably a fluorous continuous phase as defined above, so that the droplets become impoverished of the solvent and the solidifying components remaining in the "droplets" start to solidify. Thus the immisciblity can be adjusted with respect to the solvents and conditions (temperature) to control the solidification step.

The miscibility of e.g. fluorous solvents with organic solvents can be found from the literature and be chosen accordingly by a skilled person. Also the critical temperatures needed for the phase change are available from the literature or can be determined using methods known in the art, e.g. the Hildebrand-Scatchard-Theorie. Reference is also made to the articles of A. Enders and G. and of Pierandrea Lo Nostro cited above.

Thus according to the invention, the entire or only part of the droplet may be converted to a solid form. The size of the "solidified" droplet may be smaller or greater than that of the original droplet, e.g. if the amount of the monomer used for the prepolymerisation is relatively large when a prepolymerisation step is used as the solidification step.

The solid catalyst particles recovered can be used, after an optional washing step, in a polymerisation process of an olefin. Alternatively, the separated and optionally washed solid particles can be dried to remove any solvent present in the particles before use in the polymerisation step. The separation and optional washing steps can be effected in a known manner, e.g. by filtration and subsequent washing of the solids with a suitable solvent.

The droplet shape of the particles may be substantially maintained. The formed particles may have an average size range of 1 to 500 µm, e.g. 5 to 500 µm, advantageously 5 to 200 µm or 10 to 150 µm. Even an average size range of 5 to 60 µm is possible. The size may be chosen depending on the polymerisation the catalyst is used for. Advantageously, the particles are essentially spherical in shape, they have a low porosity and a low surface area.

The formation of the catalyst solution can be effected at a temperature of 0-100° C., e.g. at 20-80° C. The dispersion step may be effected at −20° C.-100° C., e.g. at about −10-70° C., such as at −5 to 30° C., e.g. around 0° C.

To the obtained dispersion an emulsifying agent as defined above, may be added to improve/stabilise the droplet formation. The solidification of the catalyst component in the droplets is preferably effected by raising the temperature of the mixture, e.g. from 0° C. temperature up to 100° C., e.g. up to 60-90° C., gradually. E.g. in 1 to 180 minutes, e.g. 1-90 or 5-30 minutes, or as a rapid heat change. Heating time is dependent on the size of the reactor.

During the solidification step, which is preferably carried out at about 60 to 100° C., preferably at about 70 to 95° C., (below the boiling point of the solvents) the solvents may preferably be removed and optionally the solids are washed with a wash solution, which can be any solvent or mixture of solvents such as those defined above and/or used in the art, preferably a hydrocarbon, such as pentane, hexane or heptane, suitably heptane. The washed catalyst can be dried or it can be slurried into an oil and used as a catalyst-oil slurry in polymerisation process.

All or part of the preparation steps can be done in a continuous manner. Reference is made to WO2006/069733 describing principles of such a continuous or semicontinuous preparation methods of the solid catalyst types, prepared via emulsion/solidification method.

Polymerisation

The olefin polymerized using the catalyst of the invention is preferably ethylene or an alpha-olefin or a mixture of ethylene and an α-olefin or a mixture of alpha olefins, for example C2-20 olefins, e.g. ethylene, propene, 1-butene, 1-hexene, 4-methyl-1-pentene, 1-octene etc. The olefins polymerized in the method of the invention may include any compound which includes unsaturated polymerizable groups. Thus for example unsaturated compounds, such as $C_{6-20}$ olefins (including cyclic and polycyclic olefins (e.g. norbornene)), and polyenes, especially $C_{4-20}$ dienes, may be included in a comonomer mixture with lower olefins, e.g. $C_{2-5}$ α-olefins. Diolefins (i.e. dienes) are suitably used for introducing long chain branching into the resultant polymer. Examples of such dienes include α,ω linear dienes such as 1,5-hexadiene, 1,6-heptadiene, 1,8-nonadiene, 1,9-decadiene, etc.

The catalysts of the present invention are particularly suited for use in the manufacture of polypropylene polymers, either homo or copolymers thereof. As comonomers are preferably used ethylene, or C4-C12 olefins, like butene, hexene, octene or any mixtures thereof.

Polymerization in the method of the invention may be effected in one or more, e.g. 1, 2 or 3, polymerization reactors, using conventional polymerization techniques, e.g. gas phase, solution phase, slurry or bulk polymerization.

In general, a combination of slurry (or bulk) and at least one gas phase reactor is often preferred, particularly with the reactor order being slurry (or bulk) then one or more gas phase reactors.

In case of propylene polymerisation for slurry reactors, the reaction temperature will generally be in the range 60 to 110° C. (e.g. 60-90° C.), the reactor pressure will generally be in the range 5 to 80 bar (e.g. 25-70 bar), and the residence time will generally be in the range 0.3 to 5 hours (e.g. 0.5 to 2 hours). The monomer is usually used as reaction medium.

For gas phase reactors, the reaction temperature used will generally be in the range 60 to 115° C. (e.g. 60 to 110° C.), the reactor pressure will generally be in the range 10 to 25 bar, and the residence time will generally be 0.5 to 8 hours (e.g. 0.5 to 4 hours) The gas used will be the monomer optionally as mixture with a non-reactive gas such as nitrogen. In addition to actual polymerisation steps and reactors, the process can contain any additional polymerisation steps, like prepolymerisation step, and any further after reactor handling steps as known in the art.

Generally the quantity of catalyst used will depend upon the nature of the catalyst, the reactor types and conditions and the properties desired for the polymer product. As is well known in the art hydrogen can be used for controlling the molecular weight of the polymer. It is particularly notable that the catalyst of the present invention performs exceptionally well over a wide range of hydrogen concentration used during the polymerisation process, which makes the catalyst beneficial to be used for productions of a wide range of polymers This forms a further aspect of the invention. The activity of the catalysts of the invention is also very high and the polymer productivity levels are excellent.

The polymers made by the catalysts of the invention are useful in all kinds of end articles such as pipes, films, moulded articles (e.g. injection moulded, blow moulded, rotomoulded articles), extrusion coatings and so on.

As noted above, the catalysts of the invention allow the formation of polypropylene materials with low chain regularity and low melting point but still with relatively high crystallinity, high molecular weight and very low xylene soluble content. This combination of features is highly attractive and it is believed that achieving this combination of features has not previously been achieved.

Thus viewed from another aspect the invention provides a polypropylene homopolymer with a melting point of less than 147° C., a percentage of 2.1 errors of at least 1% and a xylene soluble fraction of less than 0.5 wt %.

Ideally the percentage of 2.1 errors is more than 1.5%. The molecular weight of the polypropylene can be at least 300,000, preferably at least 400,000, especially at least 500,000. Some polymers can have molecular weights (Mw) of at least 800,000.

Melting points can be reduced to less than 145° C., e.g. less than 144° C. The lower limit for the melting point is preferably 138° C., e.g. 140° C.

Xylene soluble values are preferably very low, such as less than 0.5 wt %, especially less than 0.35 wt %.

A further highly preferred polymer is therefore a polypropylene homopolymer with a melting point of less than 147° C., a percentage of 2.1-errors of at least 1%, a xylene soluble fraction of less than 0.5 wt % and a Mw of at least 500,000.

Viewed from another aspect the invention provides a process for the preparation of a polypropylene homopolymer with a melting point of less than 147° C., a percentage of 2.1 errors of at least 1% and a xylene soluble fraction of less than 0.5 wt % comprising polymerising propylene in the presence of a metallocene catalyst as hereinbefore defined.

The invention will now be illustrated by reference to the following non-limiting Examples.

Analytical Tests:

Melting Temperature $T_m$ [° C.] and Crystallisation Temperature $T_c$ [° C.]:

Melting temperature ($T_m$), crystallization temperature ($T_c$), were measured (according to ISO 11357-3:1999) with a Mettler TA820 differential scanning calorimetry (DSC) on 5 to 10 mg, typically 8±0.5 mg samples. Both crystallization and melting curves were obtained during 10° C./min cooling and heating scans between 30° C. and 225° C. Melting and crystallization temperatures were taken as the peaks of endotherms and exotherms The peak temperature of the second heating scan was taken as the melting temperature $T_m$ Melt Flow Rates (MFR):

$MFR_2$ and $MFR_{21}$ [g/10 min]: ISO 1133 (230° C., 2.16 and 21.6 kg load, respectively)

GPC: Molecular weight averages, molecular weight distribution, and polydispersity index (Mn, Mw, MWD, PDI)

Molecular weight averages (Mw, Mn), Molecular weight distribution (MWD) and its broadness, described by polydispersity index, PDI=Mw/Mn (wherein Mn is the number average molecular weight and Mw is the weight average molecular weight) were determined by Gel Permeation Chromatography (GPC) according to ISO 16014-4:2003 and ASTM D 6474-99. A Waters GPCV2000 instrument, equipped with differential refractive index detector and online viscosimeter was used with 2×GMHXL-HT and 1×G7000HXL-HT TSK-gel columns from Tosoh Bioscience and 1,2,4-trichlorobenzene (TCB, stabilized with 250 mg/L 2,6-Di tert butyl-4-methyl-phenol) as solvent at 140° C. and at a constant flow rate of 1 mL/min. 209.5 µL of sample solution were injected per analysis. The column set was calibrated using universal calibration (according to ISO 16014-2:2003) with at least 15 narrow MWD polystyrene (PS) standards in the range of 1 kg/mol to 12 000 kg/mol. Mark Houwink constants for PS, PE and PP used are as per ASTM D 6474-99. All samples were prepared by dissolving 0.5-4.0 mg of polymer in 4 mL (at 140° C.) of stabilized TCB (same as mobile phase) and keeping for max. 3 hours at max. 160° C. with continuous gentle shaking prior sampling into the GPC instrument.

Intrinsic Viscosity

Polymer samples were dissolved in decalin at the concentration of 1 mg/ml and at the temperature of 135° C. The relative viscosity of the dilute polymer solution was measured according to the ISO1628-1 by use of an Automated Ubbelohde Capillary Viscometer; LAUDA PVS 1. The relative viscosity of the dissolved polymer solution was determined as a ratio of the measured kinematic viscosities of the polymer solution and the pure solvent. Intrinsic viscosity was calculated from a single viscosity measurement at known concentration by use of Huggins equation and known Huggins constant.

$^{13}$C NMR

Quantitative solution state $^{13}$C{$^1$H} nuclear magnetic resonance (NMR) spectra were recorded using a Bruker Avance III 400 NMR spectrometer with a 9.4 T superconducting standard-bore magnet operating at 400.15 and 100.62 MHz for $^1$H and $^{13}$C respectively. Approximately 200 mg of material were dissolved in approximately 3 ml of 1,1,2,2-tetrachloroethane-$d_2$ (TCE-$d_2$) inside a 10 mm NMR tube. The measurements were done at 125° C. using a $^{13}$C optimised 10 mm selective excitation probehead with nitrogen gas for all pneumatics. The data were acquired with standard 90° single-pulse excitation with NOE and bi-level WALTZ16 decoupling scheme. A total of 6144 transients were acquired per spectra using a cycle delay of 3 seconds and an acquisition time of 1.6 second.

The tacticity distribution at the triad level and regioerrors were determined from the quantitative $^{13}$C{$^1$H} NMR spectra after basic assignment as in: V. Busico and R. Cipullo, Progress in Polymer Science, 2001, 26, 443-533, and based on the method described in: C. De Rosa, F. Auriemma, M. Paolillo, L. Resconi, I. Camurati, Macromolecules 2005, 38(22), 9143-9154.

Quantification of the pentad distribution was done through integration of the methyl region in the $^{13}$C{$^1$H} spectra and when applicable corrected for any sites not related to the stereo sequences of interest, e.g. regio misinsertions.

Xylene Solubles 2.0 g of polymer is dissolved in 250 ml p-xylene at 135° C. under agitation. After 30 minutes the solution is allowed to cool for 15 minutes at ambient temperature and then allowed to settle for 30 minutes at 25° C. The solution is filtered with filter paper into two 100 ml flasks. The solution from the first 100 ml vessel is evaporated in nitrogen flow and the residue is dried under vacuum at 90° C. until constant weight is reached.

XS %=(100·m·Vo)/(mo·v); mo=initial polymer amount (g); m=weight of residue (g); Vo=initial volume (ml); v=volume of analysed sample (ml).

Al and Zr Determination (ICP-method)

The elementary analysis of a catalyst was performed by taking a solid sample of mass, M, cooling over dry ice. Samples were diluted up to a known volume, V, by dissolving in nitric acid ($HNO_3$, 65%, 5% of V) and freshly deionised (DI) water (5% of V). The solution was then added to hydrofluoric acid (HF, 40%, 3% of V), diluted with DI water up to the final volume, V, and left to stabilise for two hours. The analysis was run at room temperature using a Thermo Elemental IRIS Advantage XUV Inductively Coupled Plasma-Atomic Excitation Spectrometer (ICP-AES) which was calibrated immediately before analysis using a blank (a solution of 5% $HNO_3$, 3% HF in DI water), a low standard (10 ppm Al in a solution of 5% $HNO_3$, 3% HF in DI water), a high standard (50 ppm Al, 20 ppm Zr in a solution of 5% $HNO_3$, 3% HF in DI water) and a quality control sample (20 ppm Al, 10 ppm Zr in a solution of 5% $HNO_3$, 3% HF in DI water). The content of zirconium was monitored using the 339.198 nm line, the content of aluminium via the 396.152 nm line and the potassium using the 766.490 nm line. The reported values, required to be between 0 and 100, or further dilution is required, are an average of three successive aliquots taken from the same sample and are related back to the original catalyst using equation 1.

$$C = \frac{R \times V}{M} \quad \text{Equation 1}$$

Where:
C is the concentration in ppm, related to % content by a factor of 10,000
R is the reported value from the ICP-AES
V is the total volume of dilution in ml
M is the original mass of sample in g
If dilution was required then this also needs to be taken into account by multiplication of C by the dilution factor.

EXAMPLES

Chemicals: (rac-dimethylsilyl-bis(2-methyl-4-phenyl-5-methoxy-6-tert-butylinden-1-yl)dichlorozirconium, M=801.08 g/mol) was prepared as described in WO2007/116034. It was verified that its $^1$H NMR spectrum corresponds to the one reported in the above mentioned patent application. Its structure is shown below.

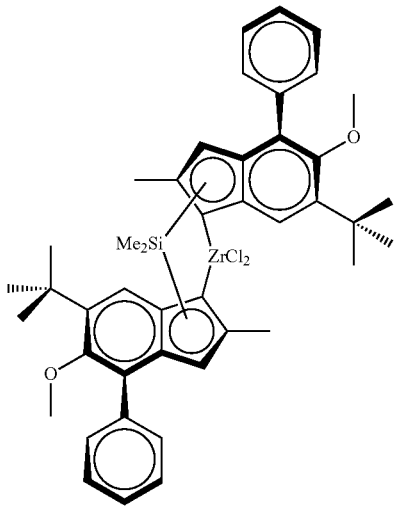

MAO was purchased from Albermarle and used as a 30 wt-% solution in toluene. Perfluoroalkylethyl acrylate esters (CAS number 65605-70-1) were purchased from the Cytonix Corporation, dried and degassed prior to use. Hexadecafluoro-1,3-dimethylcyclohexane was dried and degassed prior to use. Propylene was provided by Borealis and adequately purified before use. Triethylaluminum was purchased from Crompton and used in pure form. Hydrogen is provided by AGA and purified before use.

All the chemicals and chemical reactions were handled under an inert gas atmosphere using Schlenk and glovebox techniques, with oven-dried glassware, syringes or needles.

Example 1

Invention

The catalyst in solid particulate form with no external carrier was prepared according to the procedure described in the Example 5 of WO 2003/051934 with hexadecafluoro-1,3-dimethylcyclohexane as the continuous phase, a mixture of perfluoroalkylethyl acrylate esters having different perfluoroalkyl chain lengths as the surfactant precursor and (rac-dimethylsilyl-bis(2-methyl-4-phenyl-5-methoxy-6-tert-butylinden-1-yl)dichlorozirconium as the metallocene.

The detailed catalyst preparation was performed as follows:

Inside a glovebox, 80 μL of dry and degassed perfluoroalkylethyl acrylate esters were mixed with 2 mL of MAO in a septum bottle and left to react overnight (surfactant solution). The following day, 60.60 mg of the metallocene were dissolved in 4 mL of the MAO solution in another septum bottle and left to stir inside the glovebox (catalyst solution).

After 60 minutes, the 4 mL of the catalyst solution and 1 mL of the surfactant solution were successively added into a 50 mL emulsification glass reactor containing 40 mL of hexadecafluoro-1,3-dimethylcyclohexane at −10° C. and equipped with an overhead stirrer (stirring speed=600 rpm). A red-orange emulsion formed immediately (measured emulsion stability=14 seconds) and was stirred during 15 minutes at 0° C./600 rpm. The emulsion was then transferred via a 2/4 Teflon tube to 100 mL of hot hexadecafluoro-1,3-dimethylcyclohexane at 90° C., and stirred at 600 rpm until the transfer was completed. The stirring speed was reduced to 300 rpm and the oil bath was removed. Stirring was continued at room temperature for 15 more minutes. When the stirrer was switched off, the catalyst was left to settle up on top of the continuous phase which was siphoned off after 45 minutes. The remaining red solid catalyst was dried during 2 hours at 50° C. over an argon flow. 0.39 g of a red free flowing powder was obtained.

Comparative Example 1

The catalyst of the invention was compared to a catalyst in solid particulate form without external carrier prepared according to the above described procedure with hexadecafluoro-1,3-dimethylcyclohexane as the continuous phase, a mixture of perfluoroalkylethyl acrylate esters having different perfluoroalkyl chain lengths as the surfactant precursor and rac-cyclohexyl(methyl)silanediylbis[2-methyl-4-(4'-tert-butylphenyl)indenyl]zirconium dichloride as the metallocene (comparative example 1).

Catalyst results are disclosed in Table 1.

TABLE 1

Catalyst syntheses summary

| | | ICP analyses | | | |
|---|---|---|---|---|---|
| Code | Yield | Al (%) | Zr (%) | Al/Zr (weight) | Al/Zr (molar) |
| Example 1 | 0.39 g | 23.50 | 0.32 | 73 | 248 |
| Comp Ex 1 | 1.2 g | 31.00 | 0.37 | 84 | 283 |

Polymerisation:
Homopolymerisation of Propylene

The polymerisations were performed in a 5 L reactor. 200 μl of triethylaluminum was fed as a scavenger in 5 mL of dry and degassed pentane. The desired amount of hydrogen was then loaded (measured in mmol) and 1100 g of liquid propylene was fed into the reactor. The temperature was set to 30° C. The desired amount of catalyst (7 to 30 mg) in 5 mL of hexadecafluoro-1,3-dimethylcyclohexane is flushed into the reactor with a nitrogen overpressure. The temperature is then raised to 70° C. over a period of 15 minutes. The polymerisation is stopped after 30 minutes by venting the reactor and flushing with nitrogen before the polymer is collected.

The polymerisation results and polymer analyses are displayed in Table 2.

Comparative Example 2

The catalysts of the invention are also compared to Examples 5 and 6 of WO2007/116034, i.e. a catalyst with MAO in solution polymerisation.

The DSC analyses clearly show that the polymer obtained with the solid particulate catalyst of the invention differs from the polymers obtained with the same catalyst complex but in solution polymerisation (Table 3). The polymers of the present invention (entries 1-5, Table 2) produced at 70° C. in bulk propylene exhibit a lower melting temperature than examples 5 and 6 of W2007/116034 produced at 100° C. and 120° C. respectively in a liquid mixture of propylene and cyclohexane.

This lower melting temperature can be explained by the higher amount of 2.1 regio-errors identified by NMR spectroscopy (see table 2) compared to examples 5 and 6 of WO2007/116034 (1.7% vs. 0.6%). The polymers formed by the catalysts of the invention are thus less regioregular.

TABLE 2

Polymerisation table (The numbers displayed in italic are calculated values)
Runs 1 to 3 employ cat 1. Runs 6 to 8 employ comparative example 1

| Run | Cat | $H_2$ (mmol) | Activity Kg/g cat/h | Metal Activity (kg/g zr/h) | $MFR_2$ (g/10 min) | $MFR_{21}$ (g/10 min) | IV (dL/g) | $M_w$ (kg/mol) | MWD | Tm (° C.) | Tc (° C.) | XS (wt-%) | mm (%) | 2.1 errors (%) | 3.1 errors (%) |
|---|---|---|---|---|---|---|---|---|---|---|---|---|---|---|---|
| 1 | Ex 1 | 0.00 | 11.40 | 3563 | — | 0.80 | 7.84 | 1087 | 1.9 | 142.60 | 104.90 | 0.1 | 99.85 | 1.80 | 0.0 |
| 2 | Ex 1 | 1.00 | 27.60 | 8625 | — | 2.10 | 6.41 | 994 | 2.1 | 142.60 | 104.30 | <0.1 | 99.85 | 1.75 | 0.0 |
| 3 | Ex 1 | 6.00 | 45.10 | 14094 | 0.33 | — | 3.68 | 524 | 2.6 | 143.30 | 105.10 | 0.2 | 99.75 | 1.70 | 0.0 |
| 4 | Ex 1 | 15.00 | 67.50 | 21094 | 3.50 | — | 1.95 | 309 | 2.7 | 145.60 | 107.40 | 0.3 | 99.70 | 1.65 | 0.0 |
| 5 | Ex 1 | 25.00 | 62.90 | 19656 | 14.80 | — | 1.50 | 207 | 3.2 | 144.70 | 109.40 | — | 99.50 | 1.65 | 0.0 |
| 6 | CE 1 | 0.00 | 7.80 | 2108 | — | 5.90 | 4.84 | 757 | 2.3 | 149.20 | 110.70 | — | — | — | |
| 7 | CE 1 | 6.00 | 22.30 | 6027 | 1.30 | — | 2.56 | 416 | 2.1 | 151.20 | 110.30 | — | — | — | |
| 8 | CE 1 | 15.00 | 28.50 | 7703 | 12.30 | — | 1.67 | 222 | 2.4 | 151.00 | 112.10 | — | — | — | |

TABLE 3

| Ex* | $M_w$ (kg/mol) | MWD | Tm (° C.) | 2.1% | 3.1% |
|---|---|---|---|---|---|
| 5 | 717.00 | 2.70 | 150.60 | 0.6 | 0.1 |
| 6 | 298.00 | 2.50 | 147.80 | 0.6 | 0.5 |

*(of WO2007/116034)

The invention claimed is:

1. A solid, particulate catalyst comprising:
(i) a complex of formula (I) having two multicyclic ligands:

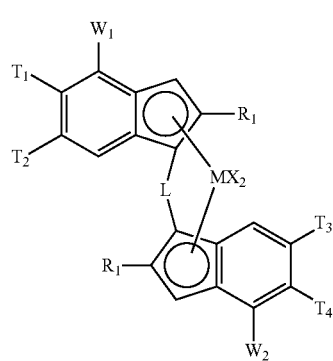

(I)

wherein
M is zirconium or hafnium;
each X of $X_2$ is a sigma ligand;

L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom, C1-C20-alkyl, tri(C1-C20-alkyl)silyl, C6-C20-aryl, C7-C20-arylalkyl or C7-C20-alkylaryl;

each $R_1$ independently is a linear or branched C1-C20 hydrocarbyl radical optionally containing one or more heteroatoms from groups 14-16;

$T_1$ and $T_4$, which can be the same or different, are an $OR^2$, a $SR^2$, $CH(R^{18})_2$, $CH_2R^{18}$, aryl or heteroaryl group;

each $R^2$, which can be the same or different, is a C1-C20 hydrocarbyl radical;

each $R^{18}$, which can be the same or different, is a C1-C20 hydrocarbyl radical or two $R^{18}$ groups together with the carbon atom to which they are attached may form a cyclic C4-C20 hydrocarbyl group;

$T_2$ and $T_3$, which may be the same or different, are a $C(R^{18})_3$ group;

$W_1$ and $W_2$, which may be the same or different, are a 5 or 6 membered aryl or heteroaryl ring wherein each atom of said ring is optionally substituted with an $R^5$ group;

each $R^5$, which can be the same or different, is a C1-C20 hydrocarbyl radical optionally containing one or more heteroatoms belonging to groups 14-16; and optionally two adjacent $R^5$ groups taken together can form a further mono or multicyclic ring condensed to $W_1$ or $W_2$, optionally substituted by one or two groups $R_5$; and (ii) a cocatalyst;
wherein the solid, particulate catalyst is free of an external carrier.

2. The solid, particulate catalyst of claim 1, obtained by a process in which
(I) a liquid/liquid emulsion system is formed, wherein the liquid/liquid emulsion system comprises a solution of the catalyst components (i) and (ii) dispersed in a solvent so as to form dispersed droplets therewith; and
(II) solid particles are formed by solidifying the dispersed droplets.

3. The solid, particulate catalyst of claim 1, wherein the two multicyclic ligands making up the complex of formula (I) are identical.

4. The solid, particulate catalyst of claim 1, wherein each X is independently a hydrogen atom, a halogen atom, a $C_{1-6}$-alkoxy group, or an R group, wherein R is a $C_{1-6}$-alkyl, phenyl, or benzyl group.

5. The solid, particulate catalyst of claim 1, wherein L is —SiR$^6$$_2$—, wherein each $R^6$ is independently C1-C20-alkyl, C6-C20-aryl, or tri(C1-C20-alkyl)silyl-residue.

6. The solid, particulate catalyst of claim 1, wherein L is a dimethylsilyl or ethylene bridge.

7. The solid, particulate catalyst of claim 1, wherein $R_1$ is a linear or branched $C_{1-10}$-alkyl radical.

8. The solid, particulate catalyst of claim 1, wherein $R_1$ is a linear C1-6 alkyl radical.

9. The solid, particulate catalyst of claim 1, wherein $W_1$ and/or $W_2$ is an optionally substituted phenyl group, or a 5 or 6 membered heteroaryl group selected from the group consisting of furanyl, thiophenyl, pyrrolyl, triazolyl, and pyridinyl.

10. The solid particulate catalyst of claim 1, wherein $R^5$ is a linear or branched, cyclic or acyclic, C1-C10-alkyl group or two adjacent $R^5$ groups taken together can form a further mono or multicyclic aromatic ring condensed to $W_1$ and/or $W_2$.

11. The solid, particulate catalyst of claim 1, wherein $T_1$ and $T_4$ are $OC_{1-6}$ alkyl.

12. The solid, particulate catalyst of claim 1, wherein $T_1$ and $T_4$ are methoxy or ethoxy.

13. The solid, particulate catalyst of claim 1, wherein $T_2$ and $T_3$ are C4-C10 branched tertiary alkyl or two $R^{18}$ groups are a C4-10 cycloalkyl with the remaining $R^{18}$ group being C1-10 alkyl.

14. The solid, particulate catalyst of claim 1, wherein said complex is of formula (II):

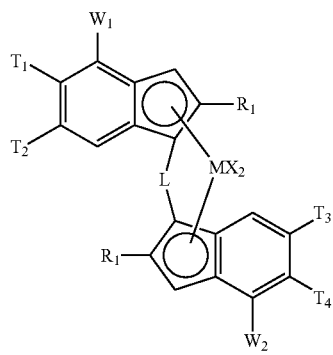

(II)

wherein
M is Zr or Hf;
$R_1$ is a linear or branched C1-C10 alkyl;
L is ethylene or $SiR^6{}_2$;
$R^6$ is C1-C10 alkyl;
each X is a hydrogen atom, a halogen atom, an OR, or an R group;
R is methyl, ethyl, isopropyl, trimethylsilyl, or a C6-C10 aryl;
$W_1$ and $W_2$ are a phenyl derivative or thiophenyl derivative optionally carrying one or two $R^5$ groups;
$R^5$ is C1-C10 alkyl or two adjacent $R^5$ groups taken together can form a further mono or multicyclic ring condensed to $W_1$ or $W_2$;
$T_1$ is OC1-C6 alkyl or a C6-C10 aryl;
$T_2$ is $C_4$-$C_{10}$ hydrocarbyl;
$T_3$ is $C_4$-$C_{10}$ hydrocarbyl; and
$T_4$ is OC1-C6 alkyl or a C6-C10 aryl.

15. The solid, particulate catalyst of claim 1, wherein said complex is of formula (III):

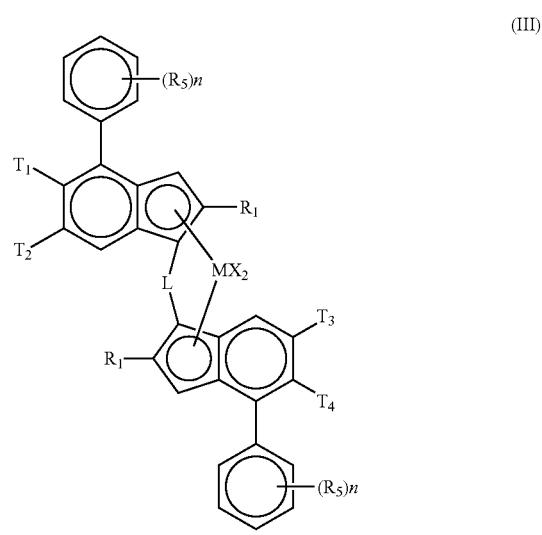

(III)

wherein
M is Zr or Hf;
$R_1$ is a linear or branched C1-C10 alkyl;
L is ethylene or $SiR^6{}_2$;
$R^6$ is C1-C10 alkyl;
each X is a hydrogen atom, a halogen atom, an OR, or an R group;
R is methyl, ethyl, isopropyl, trimethylsilyl, or a C6-C10 aryl, n is 0 to 2;
$R^5$ is C1-C10 alkyl;
$T_1$ is O—C1-C6 alkyl or a C6-C10 aryl;
$T_2$ is $C_4$-$C_{10}$ hydrocarbyl;
$T_3$ is $C_4$-$C_{10}$ hydrocarbyl; and
$T_4$ is O—C1-C6 alkyl or a C6-C10 aryl.

16. A process for the manufacture of the solid, particulate catalyst of claim 1, the process comprising providing the complex of formula (I) and a cocatalyst;
and forming a liquid/liquid emulsion system, which comprises a solution of (i) and (ii) dispersed in a solvent, and solidifying said dispersed droplets to form solid particles.

17. A process for the polymerisation of at least one olefin, the process comprising reacting the at least one olefin with the solid, particulate catalyst of claim 1.

* * * * *